United States Patent [19]

Mulcahy

[11] 4,359,231

[45] Nov. 16, 1982

[54] STEERING MECHANISM FOR THREE-WHEELED VEHICLES

[76] Inventor: Kevin M. Mulcahy, 3703 Wild Orchard La., Ft. Pierce, Fla. 33450

[21] Appl. No.: 161,661

[22] Filed: Jun. 23, 1980

[51] Int. Cl.[3] ............................................. B62D 9/02
[52] U.S. Cl. ........................... 280/87.01; 280/281 LP
[58] Field of Search .................... 280/87.01, 87.02 R, 280/87.04 R, 87.04 A, 282, 281 LP, 267–268

[56] References Cited

U.S. PATENT DOCUMENTS

| | | | |
|---|---|---|---|
| 2,370,477 | 2/1945 | McCormack | 280/87.02 R |
| 3,039,784 | 6/1962 | Davis | 280/87.02 R |
| 3,109,667 | 11/1963 | Wolner | 280/87.02 R |
| 3,311,388 | 3/1967 | Ryan et al. | 280/282 |
| 3,669,468 | 6/1972 | Rich | 280/282 |
| 4,198,072 | 4/1980 | Hopkins | 280/282 |

*Primary Examiner*—Robert R. Song
*Assistant Examiner*—Ross Weaver
*Attorney, Agent, or Firm*—Carroll F. Palmer

[57] ABSTRACT

A three-wheeled single driver-passenger vehicle having a single wheel journalled at the front of the vehicle frame and a two-wheeled rear axle assembly having comparatively large diameter wheels at the rear, has the axle casing pivotally supported by means of a sleeve bushing affixed to the axle housing being journalled on a pivot post extending upwardly and rearwardly at an angle from and with respect to the vehicle frame, whereby turning of the vehicle about a short radius, with good tracking, is accomplished by the driver-passenger simply shifting his weight to one side or the other.

4 Claims, 5 Drawing Figures

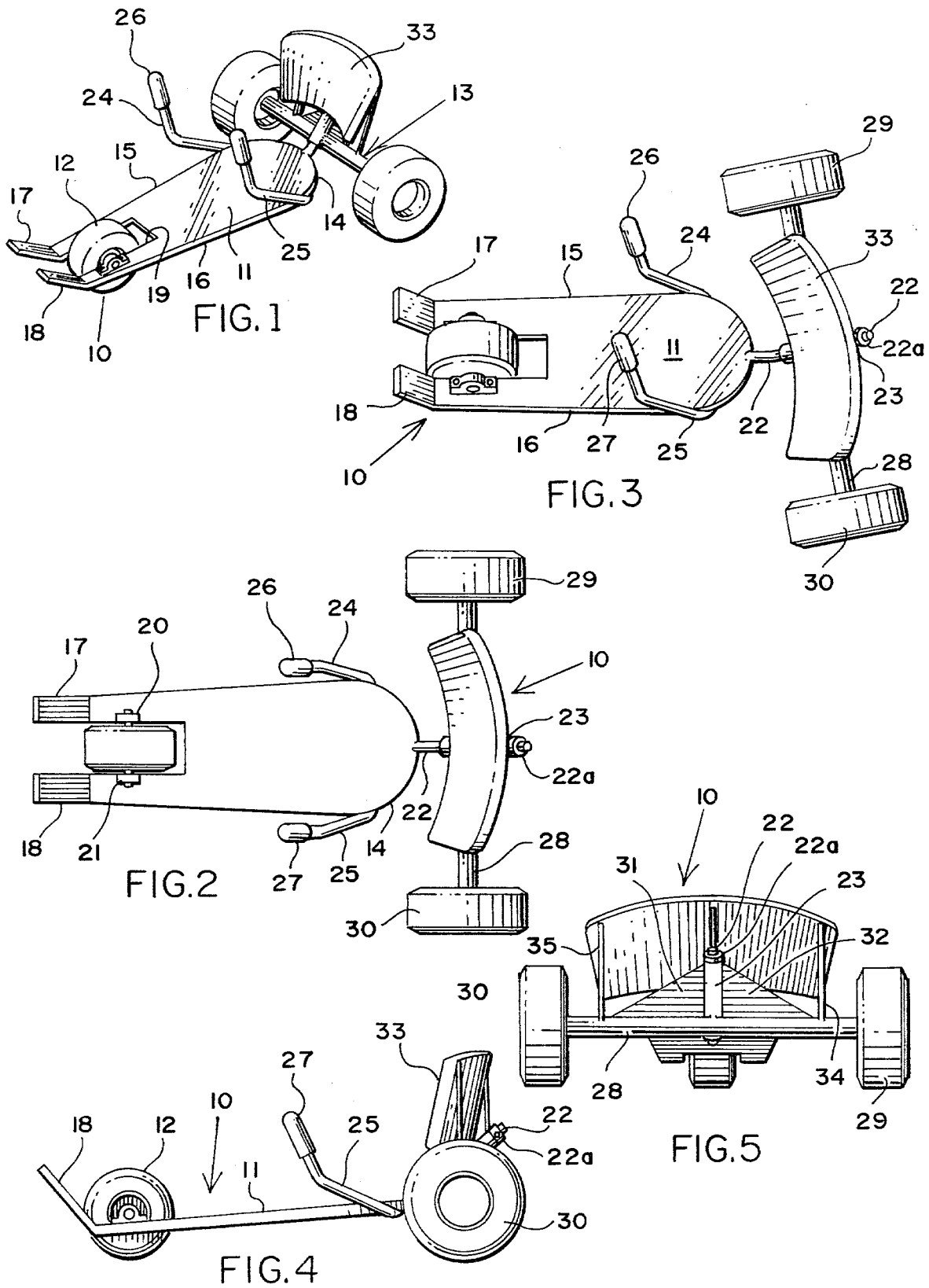

STEERING MECHANISM FOR THREE-WHEELED VEHICLES

BACKGROUND OF THE INVENTION

This invention relates to three-wheeled single passenger vehicles, principally for sports use, and is directed particularly to such a vehicle or go-cart, whether motor powered or gravity propelled, having novel and improved steering mechanism controlled solely by shifting of the body weight of the driver.

Three-wheeled single passenger vehicles for sports racing, usually downhill by gravity propulsion, are known. An important feature to be desired in such sports vehicles is maneuverability with minimum bag, particularly in the ability to turn about a short radius with a minimum loss of speed and firm tracking. It is the principal object of this invention to provide an improved steering mechanism for three-wheeled vehicles of the above nature wherein these desiderata are achieved by the provision of a steering mechanism wherein, upon the shifting of the driver's weight, both the single front wheel and dual-wheeled rear axle are cooperatively moved to direct the vehicle for turning in a tight circle.

A more particular object of the invention is to provide a steering mechanism for three-wheeled vehicles of the character described wherein turning repositioning of the dual-wheeled rear axle is achieved with use of a pivot post extending outwardly and upwardly at an angle with respect to the rear end of the driver support frame or bed, to which the rear axle casing is pivotally mounted by a sleeve bushing journalled thereon and fixed at a central position along the axle casing, and wherein the front wheel journalled at the front of the frame is of substantially smaller diameter than the two rear wheels, whereby, upon the shifting of body weight by the driver to one side or the other, the rear wheels will be moved for turning in the same direction, while, at the same time, the front wheel will be canted to advance its position of contact with the ground at a point forward of its center to cooperate with the rear wheels in achieving tight turns with minimum drag and driver effort.

Another object of the invention is to provide a steering mechanism for three-wheeled vehicles of the character described which, at the same time, maintains a low combined center of gravity of vehicle and driver, thereby further improving steering stability and tracking.

Other objects, features and advantages of the invention will be apparent from the following description when read with reference to the accompanying drawings.

BRIEF DESCRIPTION OF THE DRAWINGS

In the drawings, wherein like reference numerals denote corresponding parts throughout the several views:

FIG. 1 is an oblique view, as seen from above, of a three-wheeled vehicle embodying the invention;

FIG. 2 is a top plan view of the three-wheeled vehicle illustrated in FIG. 1, on an enlarged scale and showing the steering gear positioned for straight-ahead travel;

FIG. 3 is a plan view as in FIG. 2, but showing the steering gear and passenger support frame in position for turning the vehicle to the right;

FIG. 4 is a side elevational view of the three-wheeled vehicle illustrated in FIG. 2; and FIG. 5 is a rear end view thereof.

Referring now in detail to the drawings, reference numeral 10 designates, generally, a preferred form of steering mechanism for three-wheeled vehicles embodying the invention, the same comprising a passenger support frame 11, a front wheel 12, and a two-wheeled rear steering gear assembly 13 pivotally supported with respect to said passenger support frame in the manner and for the purpose hereinafter more particularly described.

In its simplest form, the passenger support frame 11 may comprise an elongate, flat panel fabricated of plywood or fiberglass-reinforced synthetic resin, for example, for lightness in weight as well as strength and rigidity. The back end of the passenger support frame 11 may be rounded, as indicated at 14, to merge at each side with slightly convergant side edges 15, 16 extending into upturned foot rest portions 17, 18 at the forward end. The passenger support frame 11 is symmetrical with respect to its longitudinal axis, and is provided at its forward end with a slot 19 defining the upturned foot rest portions 17, 18 and serving as a recess receiving the front wheel 12. As best illustrated in FIGS. 1 and 2, the front wheel 12 is journalled in bearings 20, 21 fixed with respect to upper surface portions of passenger support frame 11 at each side of the recess defined by slot 19. Securely fixed with respect to the rear end of passenger support frame 11 and extending directly rearwardly and upwardly at an angle of approximately 45 degrees with respect thereto, is a cylindrical, pivot post 22, preferably of steel, journalling a sleeve bearing 23 comprising the steering gear assembly 13 as is hereinafter more particularly described. The passenger support frame 11 is also provided with opposed handle bars 24, 25 fixed with respect to an extending angularly-upwardly of each side thereof just forward of the rounded back end 14. The outer ends of the handle bars 24, 25 will preferably be fitted with hand grips 26, 27, respectively, for use by the passenger for support and steering the vehicle in the manner hereinafter described.

The rear steering gear assembly 13 comprises an encased, transversely-extending axle 28 journalling, at each end, rear wheels 29, 30. As illustrated, the rear wheels 29, 30 are of equal size, and substantially larger in diameter than front wheel 12. A lower end portion of the sleeve bearing 23, at the underside thereof, is secured, such as by welding, to the outer casing of axle 28, at a central position therealong. Triangular metal plate webs 31, 32 will also preferably be welded between the sleeve bearing 23 and the axle casing, as illustrated in FIG. 5, to enhance the rigidity of connection between said sleeve bearing and said rear wheels axle. An arcuate passenger back rest 23, which may be formed of sheet metal, padded at the front surface for passenger comfort, is fixed against the sleeve bearing 23 and further supported, at each side of the back thereof, by bracing bars 34, 35 welded or otherside firmly secured therebetween. A collar 22a secured at the outer end of pivot post 22 serves as a thrust bearing preventing withdrawal of sleeve bearing 23. As best illustrated in FIG. 4, the support frame 11 is downwardly inclined toward the front, between the rear wheels 29, 30, and the comparatively small diameter front wheel 12.

In operation, when a driver-passenger seated on the support frame 11 shifts his weight by leaning for turning to one side or the other, both the front and rear wheels are repositioned as follows. Because of the greater height of the frame member or passenger carriage at the back its line of rotation will be higher in the back than in the front. Therefore, upon turning, the front wheel will be pivoted or canted in the leaning direction to make contact with the ground at a point forward of its center. The further this lean with shift of body weight, the more forward will be front wheel contact and the sharper the turn. At the same time, turning ability is enhanced by turning of the rear axle assembly in the opposite direction to the front wheels, because the pivot post is bent upward at an angle. This cooperative repositioning of the front and back wheels upon body shift turning makes the back end of the vehicle come around with the front, enabling the vehicle to turn very tight circles in either direction.

Another important feature of the device resides in its low center of gravity, which further enhances stability and ease of steering.

While the invention as illustrated and described herein is motorless and therefore suited only to downhill racing, it is to be understood that a motor with appropriate controls could be provided for driving the axle assembly rear wheels 29, 30 for self-propulsion without departing from the invention. The invention, in brief, comprises all the embodiments and modifications coming within the scope and spirit of the following claims:

What is claimed as new and for which it is desired to secure Letters Patent is:

1. A three-wheeled vehicle comprising, in combination:
   an elongate frame member including a planar web normally carried in a substantially horizontal position for supporting a driver-passenger, said frame member having a longitudinal axis of rotation about which it may turn enabling said planar web to assume positions angled relative to the horizontal,
   a front wheel journalled in a pair of bearings adjacent to front end portion of said frame member,
   a rear axle assembly journalling a rear wheel at each end thereof, the diameter of the two wheels of said axle assembly being greater than the diameter of said front wheel,
   a pivot post fixed to and extending rearwardly and upwardly at an angle with respect to a rear end portion of said frame member,
   a sleeve bearing fixed with respect to a central portion of said axle assembly, said pivot post being journalled in said sleeve bearing,
   the position of said front wheel bearings in said vehicle being below the position of said sleeve bearing so said axis of rotation of said frame member is higher in the back of the vehicle than in the front whereby, upon the driver-passenger seated upon said frame member shifting his weight to either side, said axle assembly will be moved for turning of said vehicle in the direction of said weight shift,
   and a back rest located behind said rear end portion of said frame member rigidly fixed to said rear axle assembly to move in unison therewith and independently of said frame member enabling said driver-passenger to control movement of said axle assembly by pressure of his back upon said back rest.

2. A vehicle as defined in claim 1 wherein said front end portion of said frame member is provided with a central, longitudinally-extending slot, said front wheel being received in said slot and hand grip means fixed with respect to and extending upwardly of each side of said frame member.

3. The vehicle of claim 2 wherein said slot defines a pair of laterally opposed frame portions the outer ends of which are turned upwardly at an angle to provide foot rests for the driver-passenger.

4. A steering mechanism for three-wheeled vehicles as defined in claim 2, wherein said hand grip means comprises handle bars fixed with respect to and extending upwardly of each side of said frame member, said handle bars being fitted with hand grips at their outer ends.

* * * * *